United States Patent
Burns et al.

(10) Patent No.: US 7,685,451 B2
(45) Date of Patent: Mar. 23, 2010

(54) METHOD AND APPARATUS TO LIMIT CURRENT-CHANGE INDUCED VOLTAGE CHANGES IN A MICROCIRCUIT

(75) Inventors: James S. Burns, Cupertino, CA (US); Kenneth D. Shoemaker, Los Altos Hills, CA (US); Sudarshan Kumar, Fremont, CA (US); Tom E. Wang, Milpitas, CA (US); David J. Ayers, Fremont, CA (US); Vivek Tiwari, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 2221 days.

(21) Appl. No.: 10/327,441

(22) Filed: Dec. 20, 2002

(65) Prior Publication Data
US 2004/0120445 A1 Jun. 24, 2004

(51) Int. Cl.
G06F 1/26 (2006.01)
(52) U.S. Cl. .................. 713/340; 713/300; 327/538
(58) Field of Classification Search .......... 713/340, 713/300; 327/538, 544
See application file for complete search history.

(56) References Cited

U.S. PATENT DOCUMENTS

| | | | | |
|---|---|---|---|---|
| 5,321,404 A | * | 6/1994 | Mallinson et al. | 341/169 |
| 5,969,529 A | * | 10/1999 | Eiraku et al. | 324/433 |
| 5,990,730 A | * | 11/1999 | Shinozaki | 327/544 |
| 6,208,127 B1 | * | 3/2001 | Doluca | 323/349 |
| 6,304,978 B1 | * | 10/2001 | Horigan et al. | 713/322 |
| 6,829,194 B2 | * | 12/2004 | Honda et al. | 365/226 |
| 7,007,176 B2 | * | 2/2006 | Goodfellow et al. | 713/300 |

OTHER PUBLICATIONS

Zaltsman, "Inrush Current Control for Equipment Powered by UPSs", Telecommunications Energy Conference, 1989. INTELEC '89. Conference Proceedings., Eleventh International—Oct. 1989, pp. 19.4/1-19.4/7, vol. 2.*

First Foreign Office Action from Counterpart China Patent Application No. 200310118235.2, dated Jun. 17, 2005 (9 pgs. Translation included).

Invention Patent Certificate from Counterpart China Patent Application No. 200310118235.2, Patent No. ZL 2003 1 0118235.2, Date of Announcement Jan. 3, 2007 (1 page).

* cited by examiner

*Primary Examiner*—Thuan N Du
(74) *Attorney, Agent, or Firm*—Blakely, Sokoloff, Taylor & Zafman LLP (57) ABSTRACT

A method and apparatus for compensating for current-change induced voltage changes is disclosed. In one embodiment, a digital throttle unit coupled to an instruction pipeline may generate a compensating current signal, which may then cause a dummy load to consume a compensating current. In another embodiment, a counter responsive to changes in clock frequency may generate a ramp current signal, which may then cause a dummy load to consume a current corresponding to the ramp current signal.

37 Claims, 9 Drawing Sheets

METHOD AND APPARATUS TO LIMIT
CURRENT-CHANGE INDUCED VOLTAGE
CHANGES IN A MICROCIRCUIT

FIELD

The present disclosure relates generally to microprocessor systems, and more specifically to microprocessor systems capable of deselecting or otherwise reducing power to certain processor circuits.

BACKGROUND

Many modern microprocessors utilize multiple execution units. In many operational situations, not all of these units may be performing work at a given time. For this reason, many designs permit the power to be turned off to these units, while other designs permit them to go to a reduced power state. Other portions of the circuitry, such as certain kinds of memory, may simply consume less power when not processing read or write operations. In other examples various portions of cache and other memories may be turned off when not needed. These techniques may be of use in reducing overall power consumption for battery-powered and other power limited applications.

A problem may arise due to the turning on and off of the various circuit elements. Power supply voltage changes, such as voltage spikes and voltage droops, may be induced by the rate of change of power supply current with respect to time (di/dt). For this reason thermal management strategies that envision dynamically turning off unused circuit elements may give rise to new problems with respect to power supply voltage stability.

Modern chip designs include circuit elements packed tightly together. This increased density produces thermal hot spots. The existence of thermal hot spots is another reason, in addition to the overall conservation mentioned, for the power to be turned off to certain portions of the circuitry. The existence of power supply voltage changes, such as voltage spikes and voltage droops, induced by the rate of change of power supply current with respect to time are even more an issue with these increased density designs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following disclosure describes techniques for mitigating power supply current-change induced voltage swings in a microprocessor system. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware within a microprocessor system. However, the invention may be practiced in other forms of processor such as a digital signal processor, a minicomputer, or a mainframe computer.

Figure 1A:
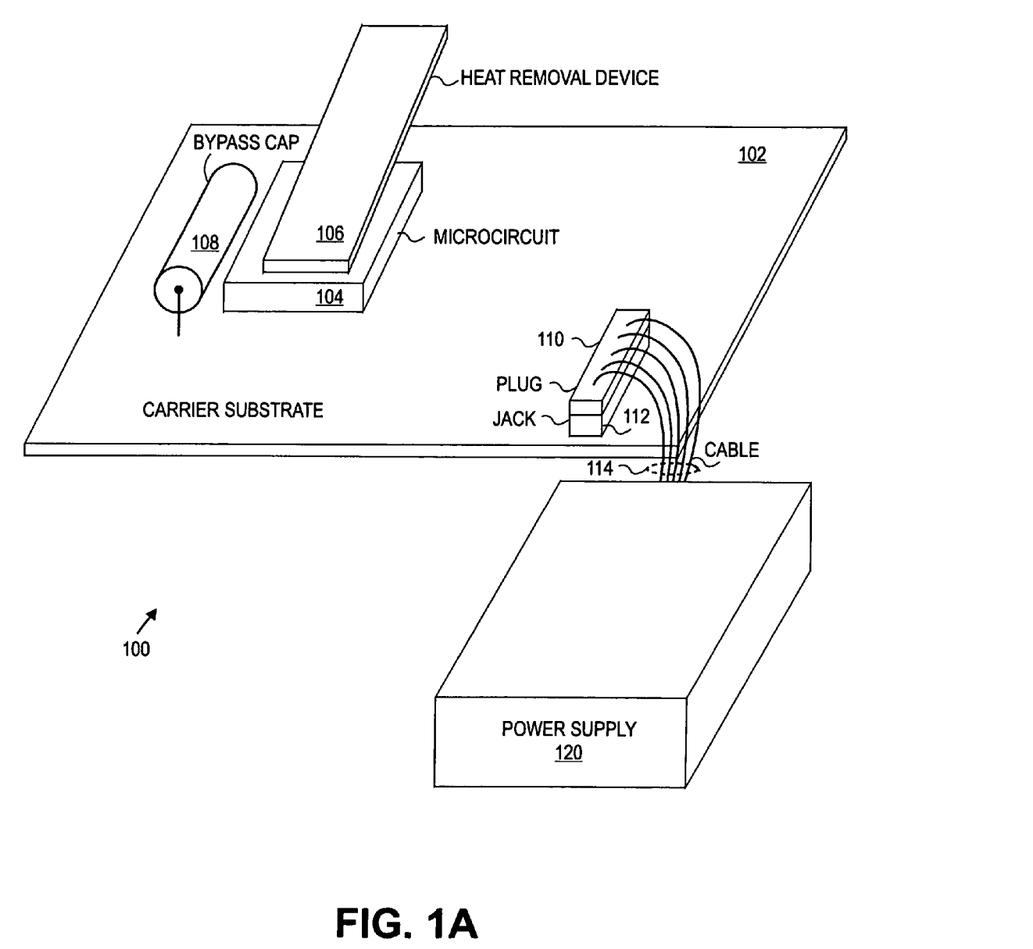
FIG. 1A is a diagram of hardware in a computer system, according to one embodiment.

Referring now to FIG. 1A, a diagram of hardware in a computer system 100 is shown, according to one embodiment. Computer system 100 includes a microcircuit 104 mounted directly or indirectly onto a carrier substrate 102. In one embodiment microcircuit 104 may be an integrated circuit, such as a microprocessor or digital signal processor. In one embodiment, carrier substrate 102 may be a motherboard or a daughterboard.

Microcircuit 104 derives the necessary supply current from power supply 120. Power supply 120 may be an alternating-current (AC) input power supply or a direct-current (DC) input power supply. The path of the supply current to microcircuit 104 may include an external cable 114 attaching to the traces of carrier substrate 102 via plug 110 and jack 112. Supply voltage changes due to generally longer-term current changes are mitigated by the position of bypass capacitor 108 in proximity to microcircuit 104.

Heat generated by the consumption of current in microcircuit 104 may need to be removed by a heat removal device 106. In various embodiments heat removal device 106 may be a heat sink with or without a cooling fan, or a heat pipe.

Figure 1B:
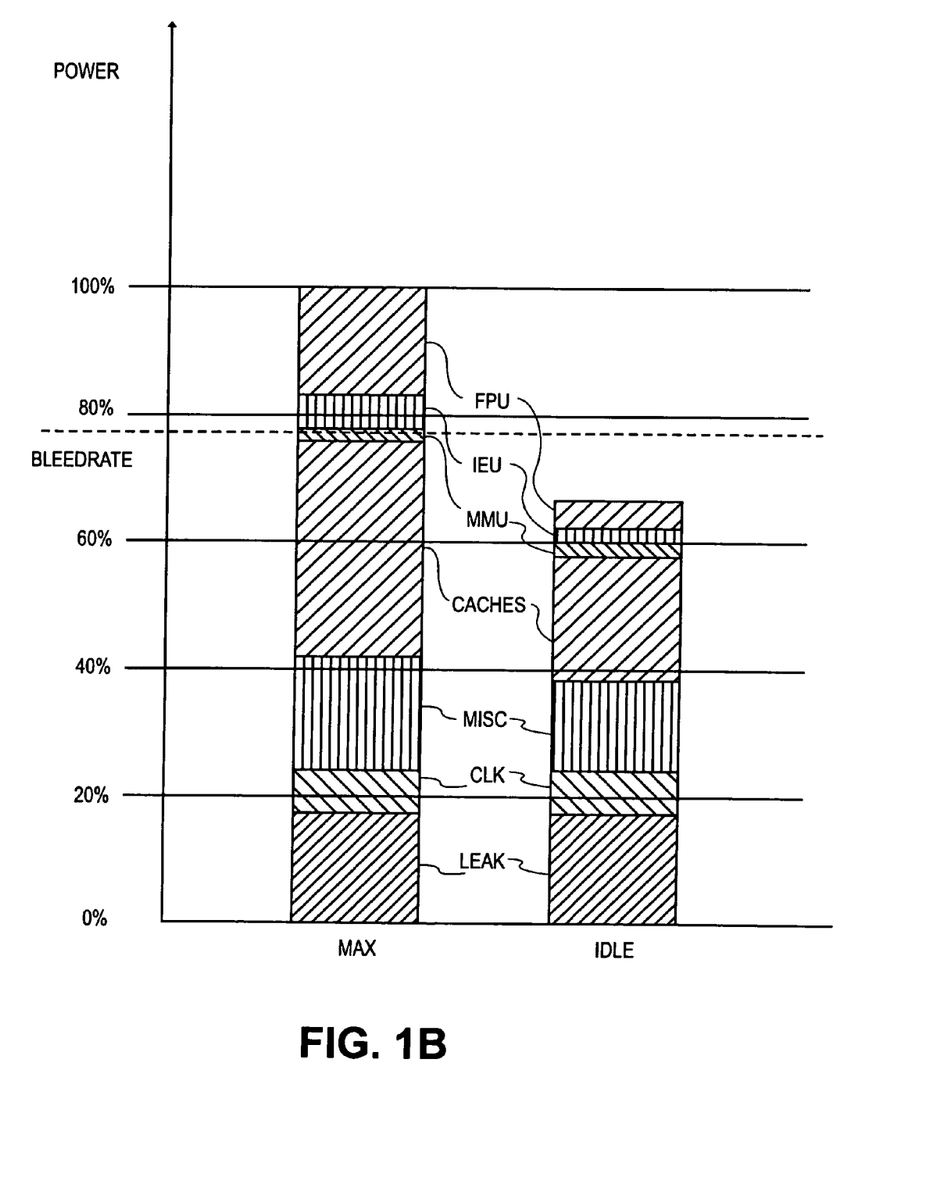
FIG. 1B is a diagram of current consumption in a circuit, according to one embodiment.

Referring now to FIG. 1B, a diagram of current consumption in a circuit is shown, according to one embodiment. In other embodiments the allocation of supply current consumption may vary greatly. In one embodiment the circuit of FIG. 1B is a microprocessor that includes multiple execution units, such as floating point units (FPU), integer execution units (IEU), and multimedia units (MMU).

The bar at the left labeled "Max" shows a representative allocation of power consumption when all circuits within the microprocessor are active. The bar at the right labeled "Idle" shows a representative allocation of power consumption when all circuits capable of operating in a power-reduced or powered-off mode within the microprocessor are operating in those modes. In some embodiments the overall power consumption may be reduced by approximately ⅓ when operating in the idle mode when compared to the max mode. This reduction in power consumption may mitigate temperature effects such as hot spots, but in turn may give rise to voltage droops caused by a rapid reduction in the supply current.

In the FIG. 1B example, certain allocations of power consumption do not vary greatly between the max mode and the idle mode. Examples are the substrate reverse-bias leakage current ("leak"), the clock distribution circuit ("elk"), and the MMU current ("MMU"). However certain of the circuits may differ greatly in power consumption between the max mode and the idle mode. Examples of these are the FPU current ("FPU"), the IEU current ("IEU"), and the sum of the currents consumed in various levels of cache ("caches").

The change in overall current consumption in a microcircuit moving from MAX mode to IDLE mode may prove too great for local capacitance to compensate for, thereby permitting a voltage spike or droop. For this reason an empirically-derived threshold, which may be called a "bleedrate threshold", may be utilized. The bleedrate threshold may be considered a threshold above which current consumption may be considered to be in a safe operating range. In other words, if the current does not drop below the bleedrate threshold, the time rate of change of the power supply current should generally not induce voltage changes capable of causing data errors. A representative bleedrate threshold is shown in FIG. 1B. In one embodiment the bleedrate threshold may be determined by modeling software. In other embodiments the bleedrate threshold may be determined by empirical measurements.

Figure 2:
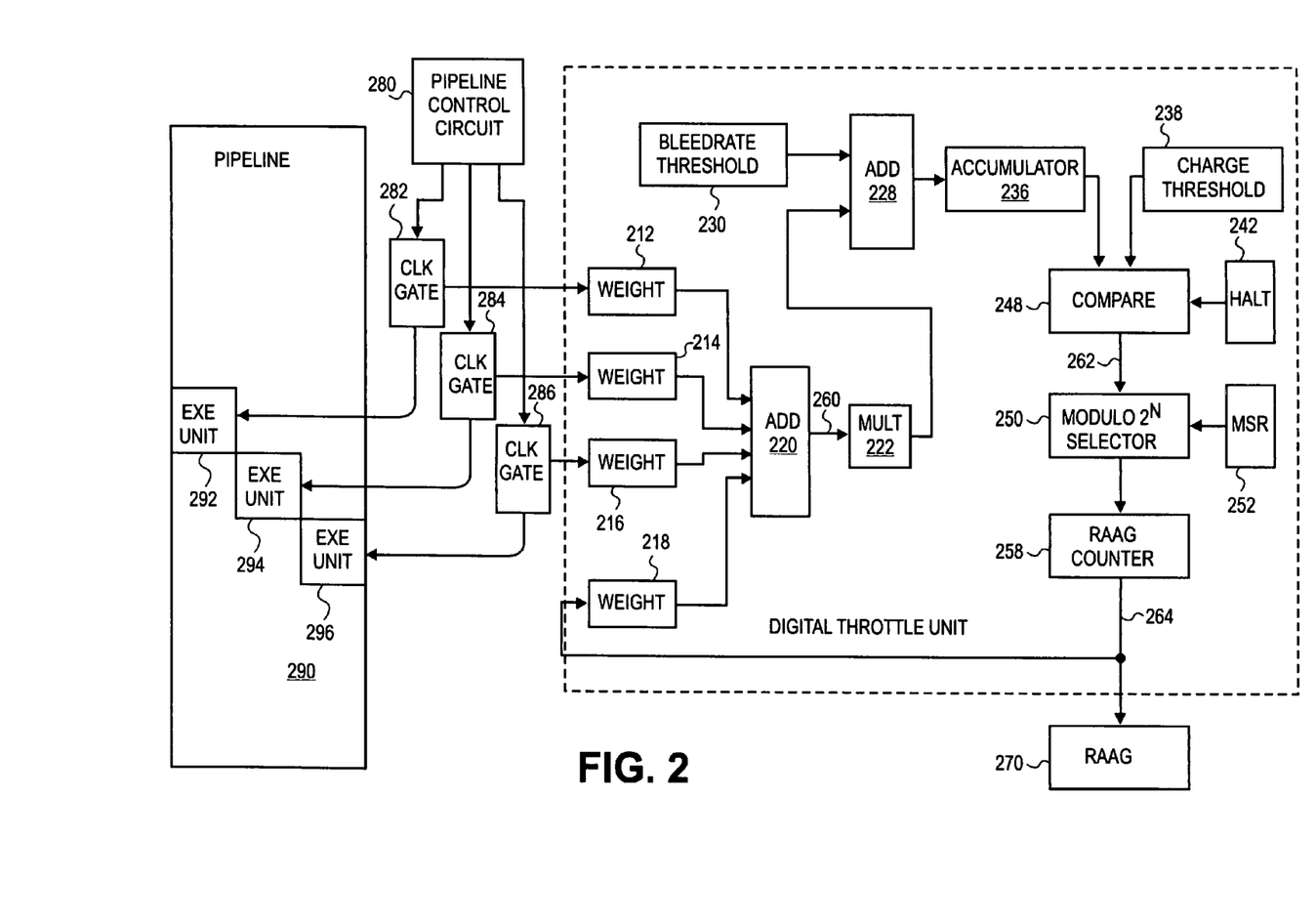
FIG. 2 is a schematic diagram of a digital throttle unit, according to one embodiment of the present disclosure.

Referring now to FIG. 2, a schematic diagram of a digital throttle unit 210 is shown, according to one embodiment of the present disclosure. In the FIG. 2 embodiment, compensating power supply currents to make up for having execution units 292, 294, 296 disabled are determined by the digital throttle unit 210 and consumed in dummy loads that may be called a remote automatic activity generator (RAAG) 270. In other embodiments, compensating currents to make up for having other circuits within a microcircuit, such as caches, disabled are determined and consumed in dummy loads. In each case the compensating currents mitigate the current changes in the operational circuitry in order to mitigate subsequent voltage spikes or droops.

A pipeline 290 of a microprocessor may include several execution units 292, 294, 296. These execution units may include FPUs, IEUs, and MMUs among other kinds of execution units. There may be more than one of each kind present in some embodiments. In one embodiment the execution units 292, 294, 296 are enabled or disabled by having a clock signal supplied or denied by a set of corresponding clock gates 282, 284, 286 controlled by a pipeline control circuit 280. Each clock gate 282, 284, 286 may send a logic signal to a weight logic circuit 212, 214, 216, respectively, each containing a weight. In differing embodiments the logic circuits may be field programmable logic arrays (FPLAs), registers, or many other kinds of logic circuits. The weights within weight logic circuit 212, 214, 216 may correspond to the difference in current consumption in the corresponding execution unit between operating mode and disabled or standby mode. In some embodiments there may be multiple weights per execution unit, corresponding to the difference in current consumption under differing operational parameters. These differing operational parameters may be caused by switching between multiple supply voltages.

The weight logic circuits 212, 214, 216 may supply their weights, when the corresponding execution units 292, 294, 296 are in their disabled or standby modes, to an adder circuit 220. The output 260 of adder circuit 220 may then correspond to the total amount of current reduced by the several execution units in disabled or standby mode. The output 260 may in some embodiments be multiplied by multiplier 222 either to normalize the output 260 or to premultiply the output 260 by minus one prior to a second addition in adder circuit 228. In other embodiments the output 260 of adder circuit 220 may be supplied directly to adder circuit 228.

A bleedrate threshold logic circuit 230 may be used to store a bleedrate threshold value. In differing embodiments the logic circuit may be field programmable logic arrays (FPLAs), registers, or many other kinds of logic circuit. The bleedrate threshold value may in one embodiment be the bleedrate threshold of FIG. 1B subtracted from 100% current. This will correspond to the maximum safe current decrease from the maximum current consumed. In some embodiments the bleedrate threshold value may be augmented to compensate for current changes in circuits other than the execution units. In one embodiment this bleedrate threshold value may be added to the inverse of the output 260 of adder circuit 220. In other embodiments the bleedrate threshold value may be subtracted to the direct output 260 of adder circuit 220.

Generally the result of the addition in adder circuit 228 corresponds to the amount of current below the bleedrate threshold that is attributable to the execution units 292, 294, 296. The result of the addition in adder circuit 228 is an instantaneous measurement at a given point in time. Therefore to compensate for current changes over a longer period of time, the result of the addition in adder circuit 228 may be time-averaged in accumulator 236. The accumulator 236 may level out short-term variations in supply current. The units of current per time are units of charge. The result of the time-averaging within accumulator 236 may be compared in comparator 248 with a charge threshold value stored within a charge threshold logic circuit 238. The charge threshold value may in some embodiments correspond to the charge that may be stored in the capacitance of the package of the microprocessor. In differing embodiments the logic circuit may be field programmable logic arrays (FPIAs), registers, or many other kinds of logic circuit.

The output of comparator 248 may generally be considered as representing whether or not the change of charge due to the time average of the current change may be compensated by the charge capable of storage by the capacitance formed by the microprocessor's packaging. In one embodiment, the output of comparator 248 may be utilized as an increment/decrement signal for a counter. This increment/decrement signal may additionally be forced into the decrement state when a halt logic 242 signals the comparator 248 that a system halt is in progress. The frequency with which the increment/decrement signal increments or decrements the RAAG counter 258 may be set by a modulo $2^n$ selector 250, where the value of n may be set by a machine state register 252.

The RAAG counter 258, when incremented and decremented as described above, may issue a compensating current signal 264 to RAAG 270 that may cause the RAAG 270 to consume a compensating current. This compensating current, derived by a time-averaging process, may prevent voltage droops yet also consume less current than if the RAAG 270 was directed to consume the instantaneous current corresponding to the change in consumption in the various execution units 292, 294, 296.

In some embodiments, the compensating current signal 264 may be fed back to adder 220 via one or more weight logic circuit 218. The weight within weight logic circuit 218 may correspond to the current dissipated within RAAG 270 when driven by the corresponding compensating current signal 264. The feeding back of the compensating current signal 264 may aid in its stability.

Figure 3:
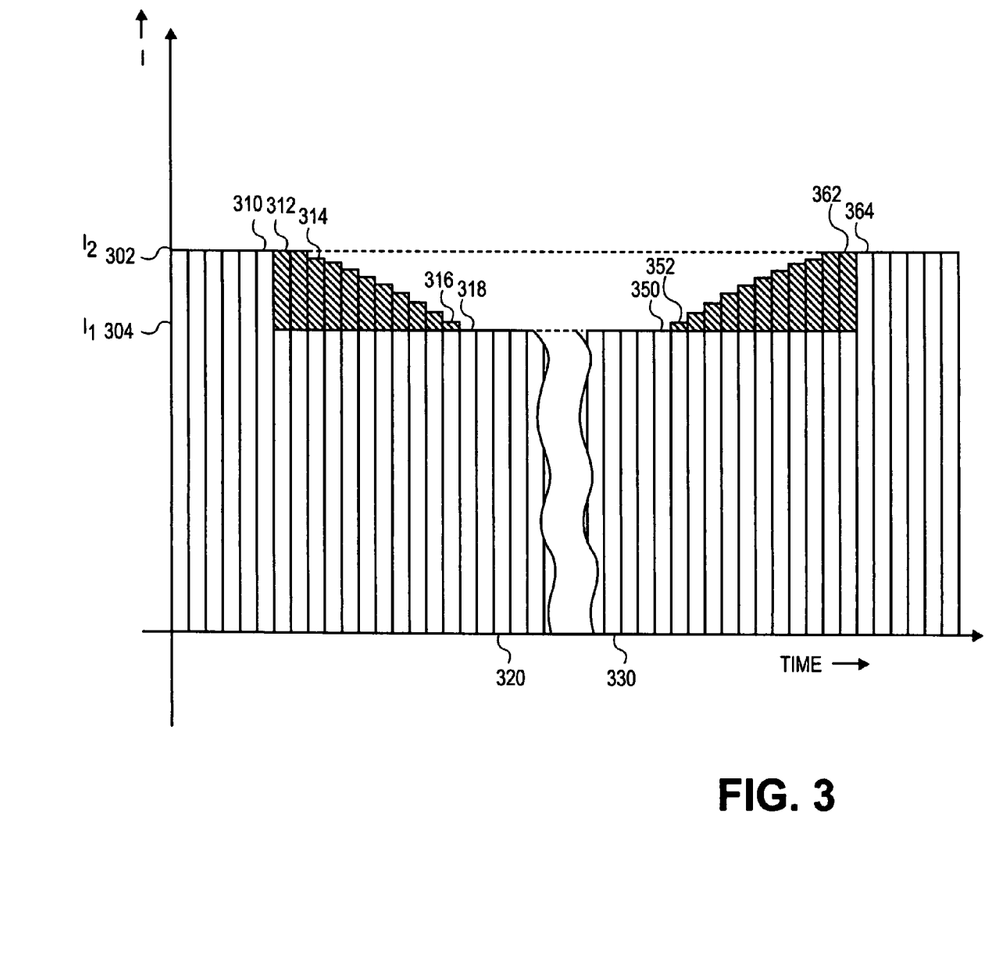
FIG. 3 is a diagram of current consumption at clock switch boundaries, according to one embodiment of the present disclosure.

Referring now to FIG. 3, a diagram of current consumption at clock switch boundaries is shown, according to one embodiment of the present disclosure. In certain embodiments, both the system clock frequency and the power supply voltage may be reduced in order to enter a lower-power consumption state of a microprocessor or other circuit. We may refer to a high frequency clock, a low frequency clock, a high supply voltage, and a low supply voltage in the following discussion. However, in other embodiments there may be additional clocks and supply voltages used other than just two of each.

Often a high frequency clock will not successfully operate at the low supply voltage, so generally the transition to the low supply voltage should be made subsequent to a high frequency clock to low frequency clock transition. Similarly, a low frequency clock to high frequency clock transition should generally be made subsequent to the transition to the high supply voltage. The changes in supply voltage generally take a long time compared to the clock transitions. In some embodiments, the change in supply voltage takes place over a period of hundreds of microseconds, so the rate of change of current is relatively small. In these embodiments, the change in supply voltage may not cause significant supply voltage spikes or droops.

However, the change in clock frequency may take place over a few clock cycles, and here the rate of change of current may be relatively large. In order to mitigate the resulting supply voltage spikes or droops, in one embodiment a set of dummy loads, such as the RAAG 270 of FIG. 2, may be turned on to compensate for the sudden changes in current due to the change in clock frequency. Consider the time period 310, where the time periods of FIG. 3 may correspond to a system clock cycle or a multiple of clock cycles. During time period 310, the circuit operating with the high frequency clock consumes supply current $I_2$ 302. A transition to low frequency clock occurs at time period 312, where the circuit operating with the low frequency clock consumes supply current $I_1$ 304.

In one embodiment, during time period 314 a ramp current signal is supplied to a RAAG, causing the RAAG to consume an amount of current corresponding to an initial value of $I_2$-$I_1$. In this manner the total supply current remains generally the same in time periods 310 and 312. At a later time period 314, the ramp current signal supplied to the RAAG is reduced, and the RAAG consumes a slightly smaller amount of current. The ramp current signal continues to cause the RAAG to consume decreasing amounts of current, until at time period 318 the RAAG consumes no current. This ramping-down of the supply current from value $I_2$ to $I_1$ over many time periods may mitigate the potential for supply voltage spikes and droops. Subsequent to the ramping down, at time period 320, a transition from a high supply voltage to a low supply voltage may be initiated.

At a much later time period 330, a transition from a low supply voltage to a high supply voltage may be completed during time period 330. At time period 350 it may be determined to initiate the transfer from the low clock frequency to the high clock frequency. In order to mitigate the effects of this change of frequency and resulting change of supply current, in one embodiment the transition from the low clock frequency to the high clock frequency is delayed until time period 364. During the interim, beginning at time period 352, a ramp current signal is supplied to the RAAG. At time period 352, the ramp current signal may cause the RAAG to consume zero or another small amount of current. The ramp current signal continues to cause the RAAG to consume increasing amounts of current, until at time period 362 the RAAG consumes the previous example's initial value of $I_2$-$I_1$. Then in time period 364 the ramp current signal turns off all current to the RAAG at the same time the delayed transition from low clock frequency to high clock frequency is permitted.

Figure 4:
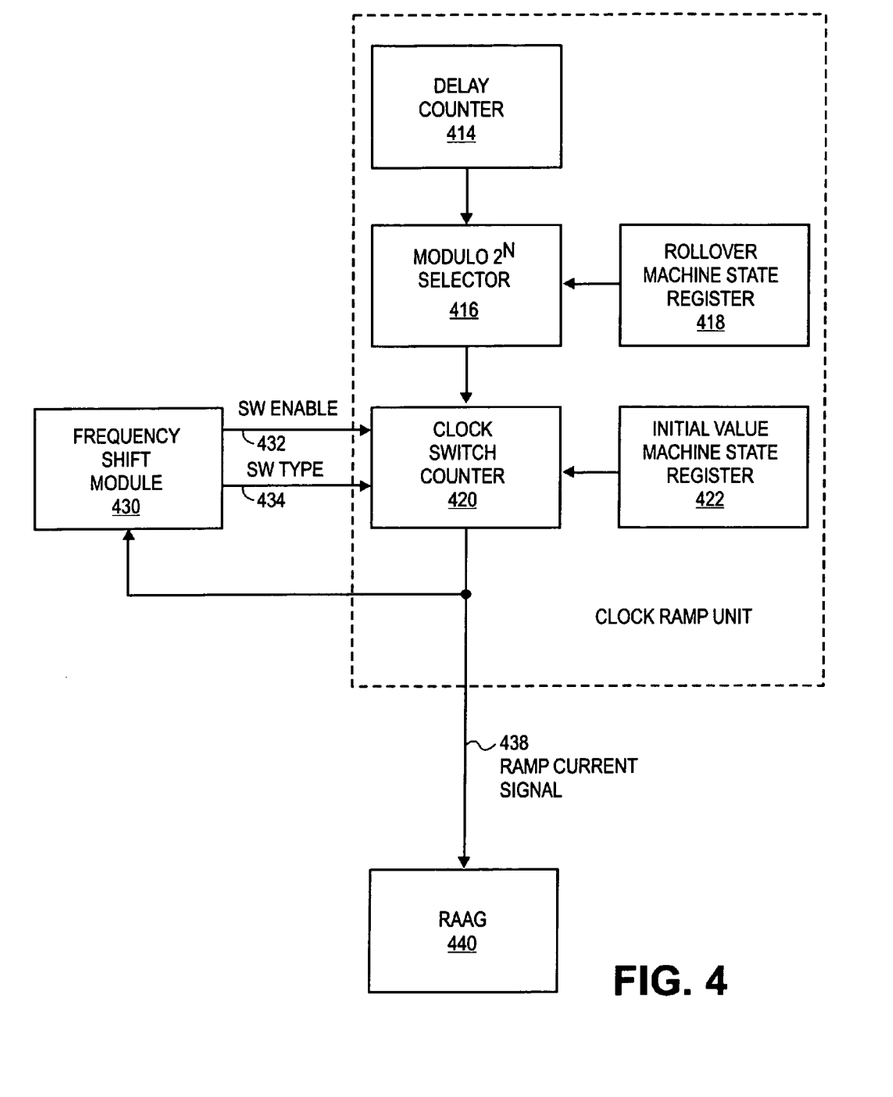
FIG. 4 is a schematic diagram of a clock ramp unit, according to one embodiment of the present disclosure.

Referring now to FIG. 4, a schematic diagram of a clock ramp unit 410 is shown, according to one embodiment of the present disclosure. The clock ramp unit 410 may be used to generate ramp current signals, as described above in connection with FIG. 3, in order to drive a dummy load such as RAAG 440.

The length of the time periods may be set by delay counter 414. In one embodiment delay counter 414 is free running and is driven by the system clock. The m outputs of delay counter 414 may be selected by modulo $2^n$ selector 416, whose output is one of the m bits of the output of delay counter 414. In this manner, the output of modulo $2^n$ selector 416 is a clock whose frequency is either 1 times the system clock, ½ the system clock, ¼ the system clock, up to $½^n$ times the system clock. The value of n selected may be supplied to modulo $2^n$ selector 416 by a roll over machine state register 418. In this manner the clock switch counter 420 is driven by a clock whose time period may be set at the implementer's direction. In other embodiments, differing sets of frequencies may be utilized to drive the clock switch counter 420.

In one embodiment there may be a frequency shift module 430 external to clock ramp unit 410. The frequency shift module 430 may generate signals that indicate when the frequency shift is desired to occur and whether it will be a high-to-low or a low-to-high transition. In the FIG. 4 embodiment, a SW Enable signal 432 may indicate that the frequency shift module 430 desires to transition the clock frequency, and a SW Type signal 434 may indicate whether it will be a high-to-low or a low-to-high transition. In other embodiments other configurations of signals may be used.

When a high clock frequency to low clock frequency transition is imminent, the SW Enable signal 432 may signal this to clock switch counter 420. The clock switch counter 420 knows that the SW Enable signal 432 may actually signal the transition because the SW Type signal 434 conveys the information that the transition will be from a high clock frequency to low clock frequency. Therefore clock switch counter 420 resets to the initial value stored in initial value machine state register 422. In one embodiment, the initial value may be a number corresponding to the difference in the current levels $I_2$-$I_1$ of FIG. 3. The value of the ramp current signal 438 at this first time period will correspond to the initial value.

During each clock transition from modulo $2^n$ selector 416, the count within clock switch counter 420 and therefore the ramp current signal 438 decrements by one unit. In this manner the RAAG may begin by consuming approximately $I_2$-$I_1$ current and may gradually ramp down to no current.

When a low clock frequency to high clock frequency transition is imminent, the SW Enable signal 432 may signal this to clock switch counter 420. However, the clock switch counter 420 knows that the SW Enable signal 432 may not signal the actual transition because the SW Type signal 434 conveys the information that the transition will be from a low clock frequency to a high clock frequency. In a low clock frequency to a high clock frequency transition, the time of the actual transition may be delayed until after the RAAG current has ramped up to a value corresponding to the initial value. So in this case clock switch counter 420 resets to zero. The value of the ramp current signal 434 at this first time period will correspond to approximately zero current.

During each clock transition from modulo $2^n$ selector 416, the count within clock switch counter 420, and therefore the ramp current signal 438, increments. In this manner the RAAG may begin by consuming approximately zero current and may gradually ramp up to approximately $I_2$-$I_1$ current. After the clock switch counter 420 reaches the initial value, supplied by initial value machine state register 422, at the next clock transition from modulo $2^n$ selector 416 the clock switch counter 420 may reset to zero. This transition on ramp current signal 428 may be received by frequency shift module 430, and used to permit the delayed low clock frequency to high clock frequency transition to occur.

Figure 5:
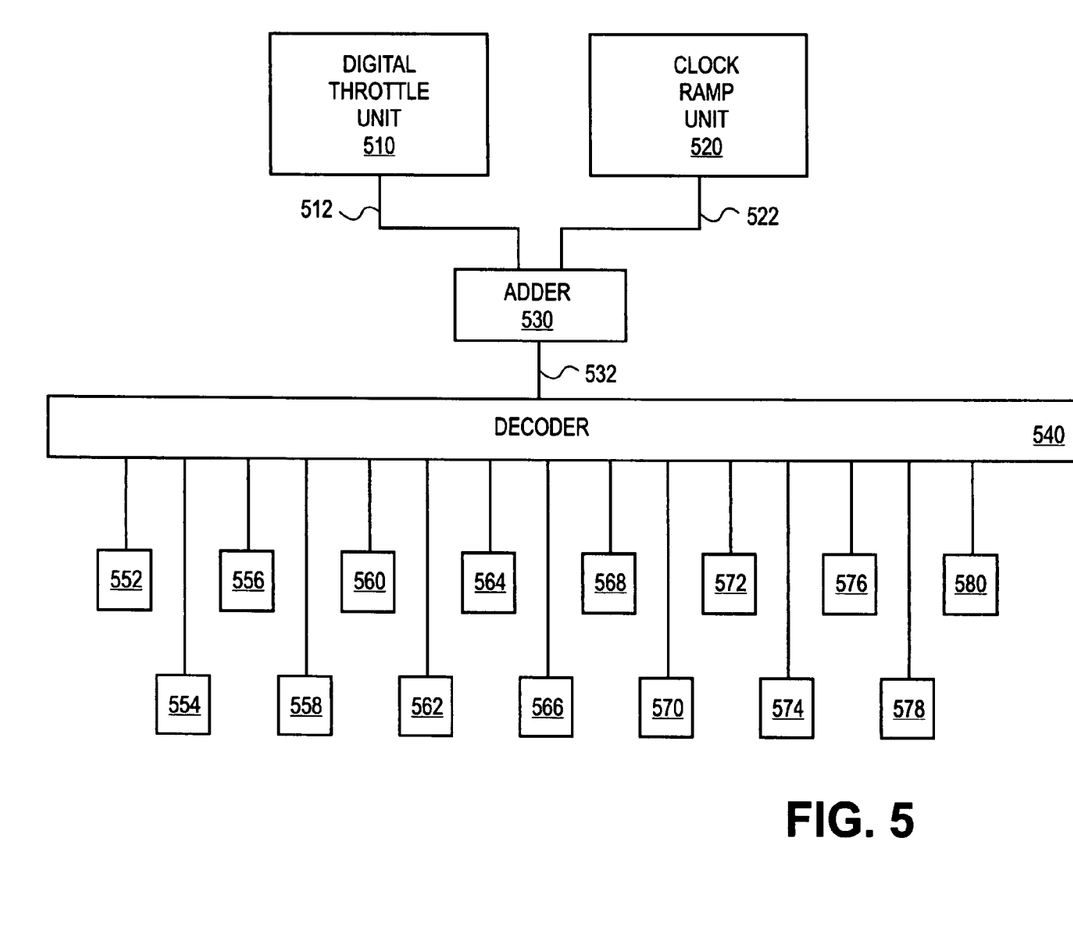
FIG. 5 is a schematic diagram of a combined digital throttle unit and clock ramp unit, according to one embodiment of the present disclosure.

Referring now to FIG. 5, a schematic diagram of a combined digital throttle unit 510 and clock ramp unit 520 driver for a dummy load is shown, according to one embodiment of the present disclosure. In one embodiment, digital throttle unit 510 and clock ramp unit 520 may be generally similar to the digital throttle unit 210 of FIG. 2 and the clock ramp unit 410 of FIG. 4, respectively.

The complementary current signal 512 from digital throttle unit 510 and ramp current signal 522 from clock ramp unit 520 may be added together in adder 530 to form a summed output 532. This summed output 532 may in one embodiment be supplied directly to a dummy load circuit. However, in the FIG. 5 embodiment the summed output 532 may be advantageously decoded in decoder 540. The decoder 540 may drive a number of individual dummy load circuit elements (DLCE) 552 through 580. The DLCEs may in one embodiment be located at the periphery of the processor core circuitry in order to lessen the thermal effects due to hot spots. In one embodiment, there are quantity 15 dummy load circuit elements, corresponding to a 4 bit summed output 532, but in other embodiments the number of dummy load circuit elements may vary. The decoder 540 may map according to the binary entries of Table I below:

TABLE I

| Summed Output | Drives to individual DLCE |
|---|---|
| 0000 | 000000000000000 |
| 0001 | 000000000000001 |
| 0010 | 000000000000011 |
| 0011 | 000000000000111 |
| 0100 | 000000000001111 |
| 0101 | 000000000011111 |
| 0110 | 000000000111111 |
| 0111 | 000000001111111 |
| 1000 | 000000011111111 |
| 1001 | 000000111111111 |
| 1010 | 000001111111111 |
| 1011 | 000011111111111 |
| 1100 | 000111111111111 |
| 1101 | 001111111111111 |
| 1110 | 011111111111111 |
| 1111 | 111111111111111 |

The mapping shown in Table I may reduce the number of transitions of DLCEs turning on and off when the output of a digital throttle unit or clock ramp unit changes, and thereby reduce small current spikes and resulting supply voltage spikes or droops.

Figure 6A:
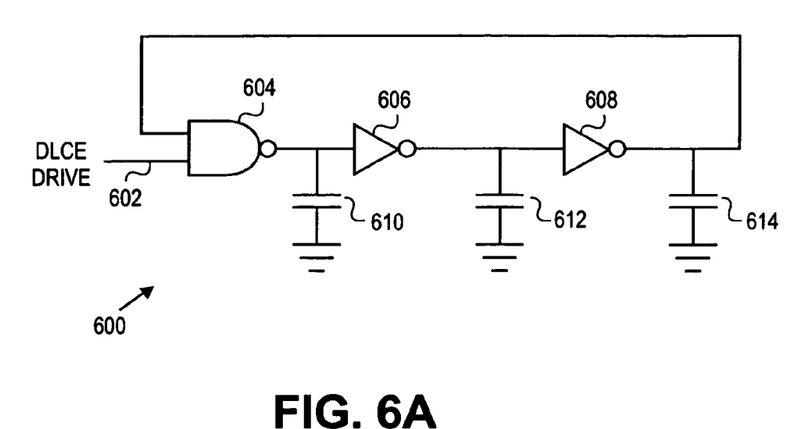
FIG. 6A is a dummy load circuit element, according to one embodiment of the present disclosure.

Referring now to FIG. 6A, a dummy load circuit element 600 is shown, according to one embodiment of the present disclosure. Logic gate 604 and inverters 606, 608 form an oscillator circuit when the DLCE drive input 602 is enabled. Capacitors 610, 612, 614 may be used to adjust the frequency of oscillation and therefore the amount of supply current consumed by logic gate 604 and inverters 606, 608. Dummy load circuit element 600 may in some embodiments be constructed to lessen changes due to process variations. Logic gate 604 and inverters 606, 608 generally will track with process variations. The capacitors 610, 612, 614 may be fabricated from relatively thin, interlaced metal fingers to help them track with process variations.

Figure 6B:
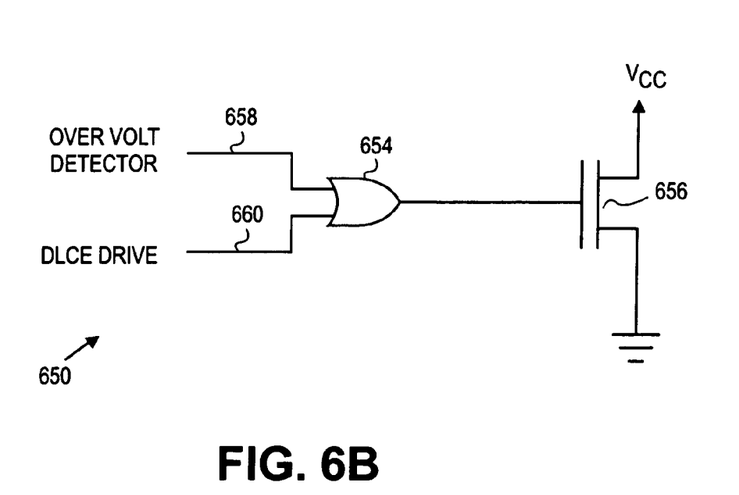
FIG. 6B is a dummy load circuit element, according to another embodiment of the present disclosure.

Referring now to FIG. 6B, a dummy load circuit element 650 is shown, according to another embodiment of the present disclosure. In the FIG. 6B embodiment, a transistor 656 is connected between supply voltage and system ground. When the device gate of transistor 656 is driven by logic gate 654, transistor 656 may carry current and therefore act as a dummy load. In one embodiment, DLCE 650 may serve two purposes. Logic gate 654 may receive inputs from an over-voltage detector signal as well as a DLCE drive signal from a DLCE drive circuit, such as a digital throttle unit or a clock ramp unit. When the over-voltage detector detects a voltage spike, it may send an over voltage detector signal to logic gate 654, turning on transistor 656 and thereby helping to lessen the voltage spike. When the DLCE drive circuit requires current consumption, it may send a DLCE drive signal to logic gate 654, turning on transistor 656.

Figure 7:
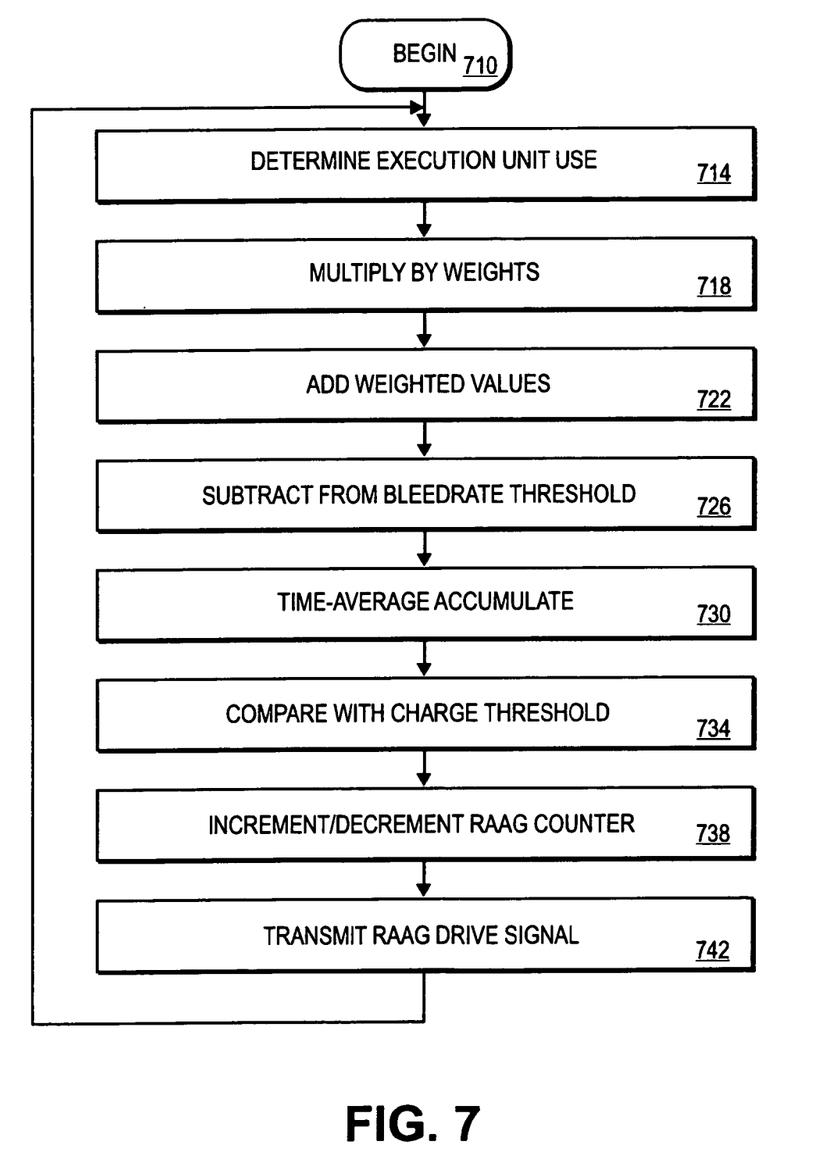
FIG. 7 is a flowchart of the determination of compensating current, according to one embodiment of the present disclosure.

Referring now to FIG. 7, a flowchart of the determination of compensating current is shown, according to one embodiment of the present disclosure. The FIG. 7 embodiment begins in block 714 by determining the usage of the execution units. In one embodiment, the execution units not in use are determined by the circuits that deny clock to those execution units not in use. Then in block 718 the number of such execution units not in use of each type are multiplied by corresponding weights for each type, where the weights may represent how much current one of the corresponding execution units would consume if operating. (In other embodiments the weights may represent the difference in current consumed in operational mode and a standby mode.)

In block 722 the weighted values are added together to form an output that represents the difference between the current when all execution units are operating and the current when the execution units as noted are turned off or in a standby state. Then in block 726 the output is subtracted from a bleedrate threshold, which may be one of the bleedrate thresholds discussed above in connection with FIG. 2. The result from block 726 may then be accumulated in block 730 to form a time-averaged value of the result of the block 726 subtraction.

The time-averaged value of block 730 may then be compared with a charge threshold, where in one embodiment the charge threshold may be the charge threshold discussed above in connection with FIG. 2. Then in block 738 the RAAG counter may be incremented or decremented depending upon the results of the comparison performed in block 734. The resulting output of the RAAG counter may be used as the determination of a compensating current. In block 742 this output may be sent to the RAAG as a drive signal.

Figure 8:
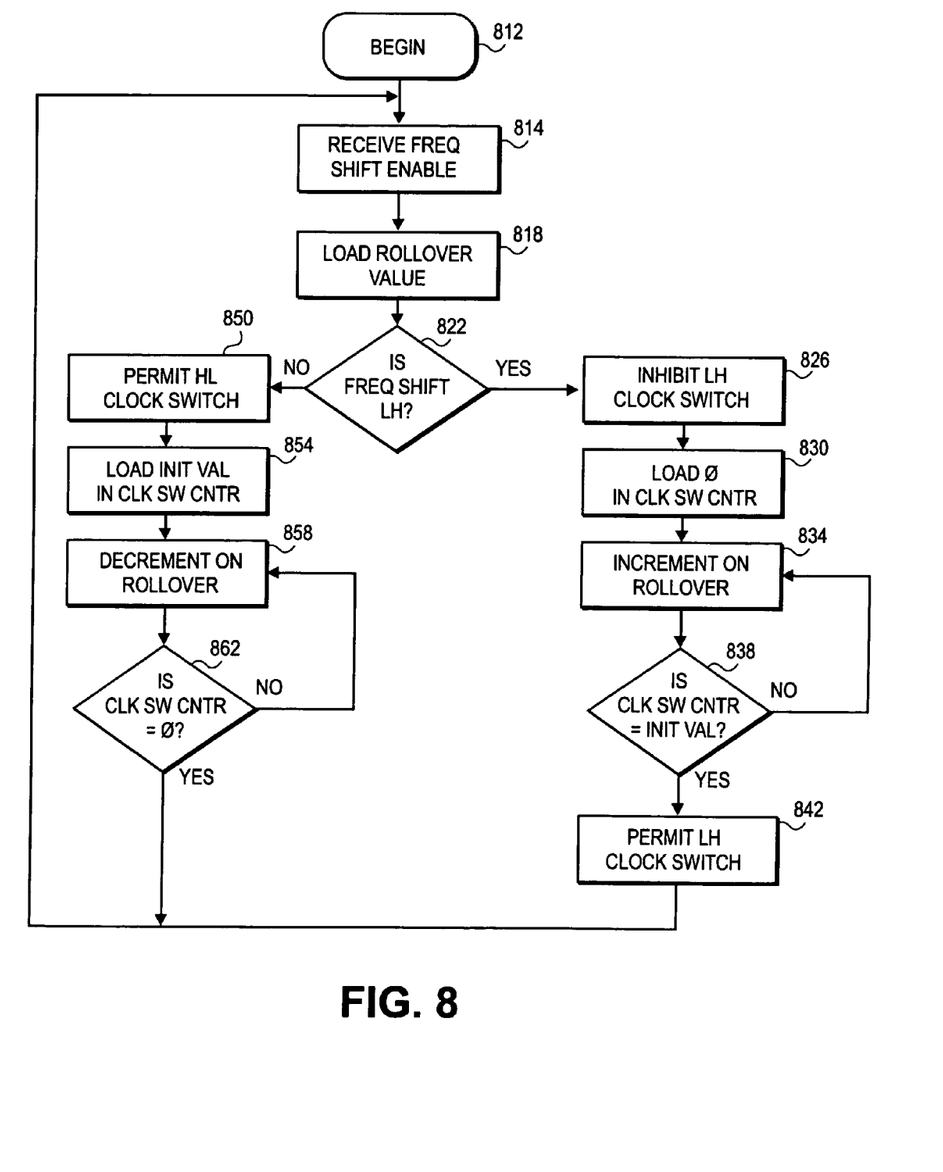
FIG. 8 is a flowchart of the determination of compensating current, according to another embodiment of the present invention.

Referring now to FIG. 8, a flowchart of the determination of compensating current is shown, according to another embodiment of the present invention. Beginning in block 810, the process begins when a frequency shift enable signal is received at block 814. Then in block 818, a rollover value is loaded into a selector in order to set the update clock rate, which in certain embodiments may be dependent upon the system clock rate or on a free-running clock rate. In other embodiments the update clock rate may be set at other times and in other ways.

In decision block 822, the process determines whether the pending frequency shift will be a low-to-high frequency shift. If so, then in block 826 the pending low-to-high frequency shift will be inhibited. Then in block 830 a zero value may be loaded into a clock switch counter. In one embodiment the zero value may be numerically zero. In other embodiments, a small number near to zero may be used. The output of the clock switch counter may then drive a dummy load, forming the beginning of a compensating current. Then when a clock transition at the update rate occurs, in block 834 the clock switch counter may increment. Each time the clock switch counter increments, the compensating current may increase.

In decision block 838 it is determined whether the clock switch counter has incremented to an initial value. In one embodiment, the initial value may be the initial value as determined above in connection with the discussion of FIG. 3. If not, then the process returns to block 834. If, however, the clock switch counter has incremented to the initial value, then in block 842 the inhibited low-to-high frequency shift may be permitted, and at essentially the same time the clock switch counter may be reset to zero. In this manner the increase in current due to the low-to-high frequency shift may be offset by the reduction in the compensating current in the dummy load. The process may then return to block 814 to wait for another frequency shift enable signal.

If, however, in decision block 822 the process determines that the pending frequency shift will not be a low-to-high frequency shift, in block 850 the high-to-low frequency shift is permitted to occur. Then in block 854 an initial value is loaded into the clock switch counter. In one embodiment, the initial value may be the initial value as determined above in connection with the discussion of FIG. 3. Again the output of the clock switch counter may drive a dummy load, forming the beginning of a compensating current. Then when a clock transition at the update rate occurs, in block 858 the clock switch counter may decrement. Each time the clock switch counter decrements, the compensating current may decrease.

In decision block 862 it is determined whether the clock switch counter has decremented to a zero value. If not, then the process returns to block 858. If, however, the clock switch counter has decremented to the zero value, then the process may return to block 814 to wait for another frequency shift enable signal.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a pipeline control circuit to enable execution units in a pipeline coupled to the pipeline control circuit;
a digital throttle unit coupled to said pipeline control circuit to generate a compensating current signal based on which of the execution units are not enabled; and
a dummy load circuit coupled to said digital throttle unit to consume a current corresponding to said compensating current signal.

2. The apparatus of claim 1, wherein said digital throttle unit includes first logic to contain current weights corresponding to currents consumed by said execution units when enabled.

3. The apparatus of claim 2, wherein said digital throttle unit is to add said current weights corresponding to said execution units when disabled, and to compare to a first threshold value, giving a first result.

4. The apparatus of claim 3, further comprising an accumulator to time average said first result creating a second result.

5. The apparatus of claim 4, further comprising a comparator to compare said second result to a second threshold, to create an increment/decrement signal.

6. The apparatus of claim 5, further comprising a counter to receive said increment/decrement signal.

7. The apparatus of claim 6, wherein said counter to output said compensating current signal.

8. The apparatus of claim 6, wherein said counter increments or decrements at a rate given by a selector.

9. The apparatus of claim 3, further comprising a second logic to contain a compensating weight corresponding to said compensating current signal.

10. The apparatus of claim 9, wherein said first result is modified by said compensating weight.

11. The apparatus of claim 1, wherein said dummy load includes dummy load elements that may be turned on responsive to said compensating current signal.

12. An apparatus, comprising:
a first counter responsive to a clock switch enable signal and a clock switch type signal to produce a ramp current signal, wherein the clock switch enable signal to indicate a transition in a clock frequency and the clock switch type signal to indicate whether the transition in the clock frequency is high to low or low to high; and
a dummy load circuit coupled to said ramp current signal to consume a current corresponding to said ramp current signal.

13. The apparatus of claim 12, wherein said first counter to set value to zero responsive to said clock switch enable signal when said clock switch type signal indicates a low frequency to high frequency switch.

14. The apparatus of claim 13, wherein said first counter to delay said low frequency to high frequency switch.

15. The apparatus of claim 12, wherein said first counter to set value to an initial value responsive to said clock switch enable signal when said clock switch type signal indicates a high frequency to low frequency switch.

16. The apparatus of claim 15, wherein said initial value corresponds to a difference between a low frequency current consumption and a high frequency current consumption.

17. The apparatus of claim 12, wherein said first counter to be clocked by a second counter.

18. An apparatus, comprising:
a pipeline control circuit to enable execution units in a pipeline;
a digital throttle unit coupled to said pipeline control circuit to generate a compensating current signal based on which execution units are enabled;
a first counter responsive to a clock switch enable signal and a clock switch type signal, to produce a ramp current signal, wherein the clock switch enable signal to indicate a transition in a clock frequency and the clock switch type signal to indicate whether the transition in the clock frequency is high to low or low to high; and
a dummy load circuit coupled to said digital throttle unit and first counter to consume said compensating current signal and to said ramp current signal.

19. The apparatus of claim 18, further comprising an adder to add said compensating current signal and to said ramp current signal to form a composite current signal.

20. The apparatus of claim 19, further comprising a decoder to map said composite current signal to dummy load circuit elements of said dummy load circuit.

21. A method, comprising:
determining which execution units are not in use in a pipeline;

determining a compensating current based on the execution units which are not in use; and consuming said compensating current in a dummy load.

22. The method of claim 21, wherein said determining a compensating current includes summing weights corresponding to current consumed by said execution units if operating, and then comparing an outcome of said summing to a first threshold.

23. The method of claim 22, wherein said determining a compensating current includes time averaging a result of said comparing outcome, and then determining from said time averaging whether to increase or decrease said compensating current.

24. A method, comprising:
receiving a frequency shift enable;
determining whether a frequency shift will be low to high or high to low;
if high to low, setting a compensating current to an initial value and then decreasing said compensating current to zero over a first time period; and
if low to high, inhibiting said frequency shift, setting said compensating current to zero and then increasing said compensating current to said initial value over a second time period, and then permitting said frequency shift.

25. The method of claim 24, wherein said decreasing said compensating current includes decreasing a value sent to a dummy load.

26. The method of claim 25, wherein said decreasing a value includes clocking a counter at a selected clock rate.

27. The method of claim 24, wherein said increasing said compensating current includes increasing a value sent to a dummy load.

28. The method of claim 27, wherein said increasing a value includes clocking a counter at a selected clock rate.

29. A system, comprising:
a pipeline control circuit to enable execution units in a pipeline;
a digital throttle unit coupled to said pipeline control circuit to generate a compensating current signal based on which of the execution units of the pipeline are not enabled;
a dummy load circuit coupled to said digital throttle unit to consume a current corresponding to said compensating current signal; and
an alternating current power supply coupled to said dummy load circuit to supply said current.

30. The system of claim 29, wherein said digital throttle unit includes first logic to contain current weights corresponding to currents consumed by said execution units when enabled.

31. The system of claim 30, wherein said digital throttle unit is to add said current weights corresponding to said execution units when disabled, and to compare to a first threshold value, giving a first result.

32. The system of claim 31, further comprising an accumulator to time average said first result creating a second result.

33. The system of claim 32, further comprising a comparator to compare said second result to a second threshold, to create an increment/decrement signal.

34. A system, comprising:
a first counter responsive to a clock switch enable signal and a clock switch type signal to produce a ramp current signal, wherein the clock switch enable signal to indicate a transition in a clock frequency and the clock switch type signal to indicate whether the transition in the clock frequency is high to low or low to high;
a dummy load circuit coupled to said ramp current signal to consume a current corresponding to said ramp current signal; and
an alternating current power supply coupled to said dummy load circuit to supply said current.

35. The system of claim 34, wherein said first counter to set value to zero responsive to said clock switch enable signal when said clock switch type signal indicates a low frequency to high frequency switch.

36. The system of claim 35, wherein said first counter to delay said low frequency to high frequency switch.

37. The system of claim 34, wherein said first counter to set value to an initial value responsive to said clock switch enable signal when said clock switch type signal indicates a high frequency to low frequency switch.

\* \* \* \* \*